US011095901B2

(12) United States Patent
Hsu et al.

(10) Patent No.: US 11,095,901 B2
(45) Date of Patent: Aug. 17, 2021

(54) OBJECT MANIPULATION VIDEO CONFERENCE COMPRESSION

(71) Applicant: International Business Machines Corporation, Armonk, NY (US)

(72) Inventors: En-Shuo Hsu, Taipei (TW); Po-Hsun Tseng, New Taipei (TW); David Shao Chung Chen, Taipei (TW); Wei-Te Chiang, Taipei (TW); Hsiao-Yung Chen, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 16/579,278

(22) Filed: Sep. 23, 2019

(65) Prior Publication Data
US 2021/0092403 A1 Mar. 25, 2021

(51) Int. Cl.
*H04N 19/159* (2014.01)
*G06K 9/46* (2006.01)
*G06K 9/00* (2006.01)
*H04N 19/182* (2014.01)

(52) U.S. Cl.
CPC ....... *H04N 19/159* (2014.11); *G06K 9/00248* (2013.01); *G06K 9/00255* (2013.01); *H04N 19/182* (2014.11)

(58) Field of Classification Search
CPC ............... H04N 19/159; H04N 19/182; G06K 9/00248; G06K 9/00255
USPC ..................................................... 375/240.13
See application file for complete search history.

(56) References Cited

U.S. PATENT DOCUMENTS

| 6,233,356 | B1 * | 5/2001 | Haskell | H04N 21/23412 |
| | | | | 382/243 |
| 7,315,631 | B1 | 1/2008 | Corcoran et al. | |
| 7,983,499 | B2 * | 7/2011 | Haskell | H04N 19/70 |
| | | | | 382/243 |
| 8,649,426 | B2 | 2/2014 | White et al. | |
| | | (Continued) | | |

FOREIGN PATENT DOCUMENTS

| CN | 102332095 A | 1/2012 |
| CN | 103902960 A | 7/2014 |

OTHER PUBLICATIONS

Qi et al., "LBVC: Towards Low-bandwidth Video Chat on Smartphones", MMSys '15, Mar. 2015, 12 pages. http://www.cs.wm.edu/~gpeng/files/LBVC_MMSys15.pdf.
(Continued)

*Primary Examiner* — Albert Kir
(74) *Attorney, Agent, or Firm* — Nolan M. Lawrence

(57) ABSTRACT

A picture is obtained. The picture is intended to be compressed in a video stream. The picture includes pixel data that depicts a scene. A subject in the pixel data that depicts the scene is identified. The identification is based on the pixel data included in the picture. A plurality of object data is generated. The generated object data is related to the subject. The generation is based on the identification of the subject. An intended compression format of the pictured to be compressed in the video stream is determined. A pixel operation on the picture is performed. The performance is based on the determination of the intended compression format and before compression of the picture. The generated plurality of object data is related with the picture after compression of the picture.

20 Claims, 7 Drawing Sheets

(56) References Cited

U.S. PATENT DOCUMENTS

| | | |
|---|---|---|
| 9,094,571 B2 | 7/2015 | Yu et al. |
| 10,678,410 B2* | 6/2020 | Ye .......................... G06F 40/166 |
| 2002/0114392 A1* | 8/2002 | Sekiguchi ............ H04N 19/142 |
| | | 375/240.15 |
| 2010/0034268 A1* | 2/2010 | Kusakabe ............ H04N 19/593 |
| | | 375/240.15 |
| 2017/0013279 A1* | 1/2017 | Puri ..................... H04N 19/527 |

OTHER PUBLICATIONS

Li et al., "A study on face morphing algorithms," EE368 Project, printed: Sep. 19, 2019, 12 pages. https://ccrma.stanford.edu/~jacobliu/368Report/index.html.

* cited by examiner

OBJECT MANIPULATION VIDEO CONFERENCE COMPRESSION

BACKGROUND

The present disclosure relates to video conferencing, and more specifically, to increasing performance of video conferencing.

Video conferencing may enable two or more parties to communicate with each other remotely. Video conferencing may operate based on transmitting and receiving audio and video. The audio and video can be, in some cases, in a compressed format. However, in some cases, the mere use of a compressed format does not result in a particularly efficient communication of audio and video data.

SUMMARY

According to embodiments, disclosed is a method, system, and computer program product for video compression. A picture is obtained. The picture is intended to be compressed in a video stream. The picture includes pixel data that depicts a scene. A subject in the pixel data that depicts the scene is identified. The identification is based on the pixel data included in the picture. A plurality of object data is generated. The generated object data is related to the subject. The generation is based on the identification of the subject. An intended compression format of the pictured to be compressed in the video stream is determined. A pixel operation on the picture is performed. The performance is based on the determination of the intended compression format. The pixel operation is performed before compression of the picture. The generated plurality of object data is related with the picture after compression of the picture.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
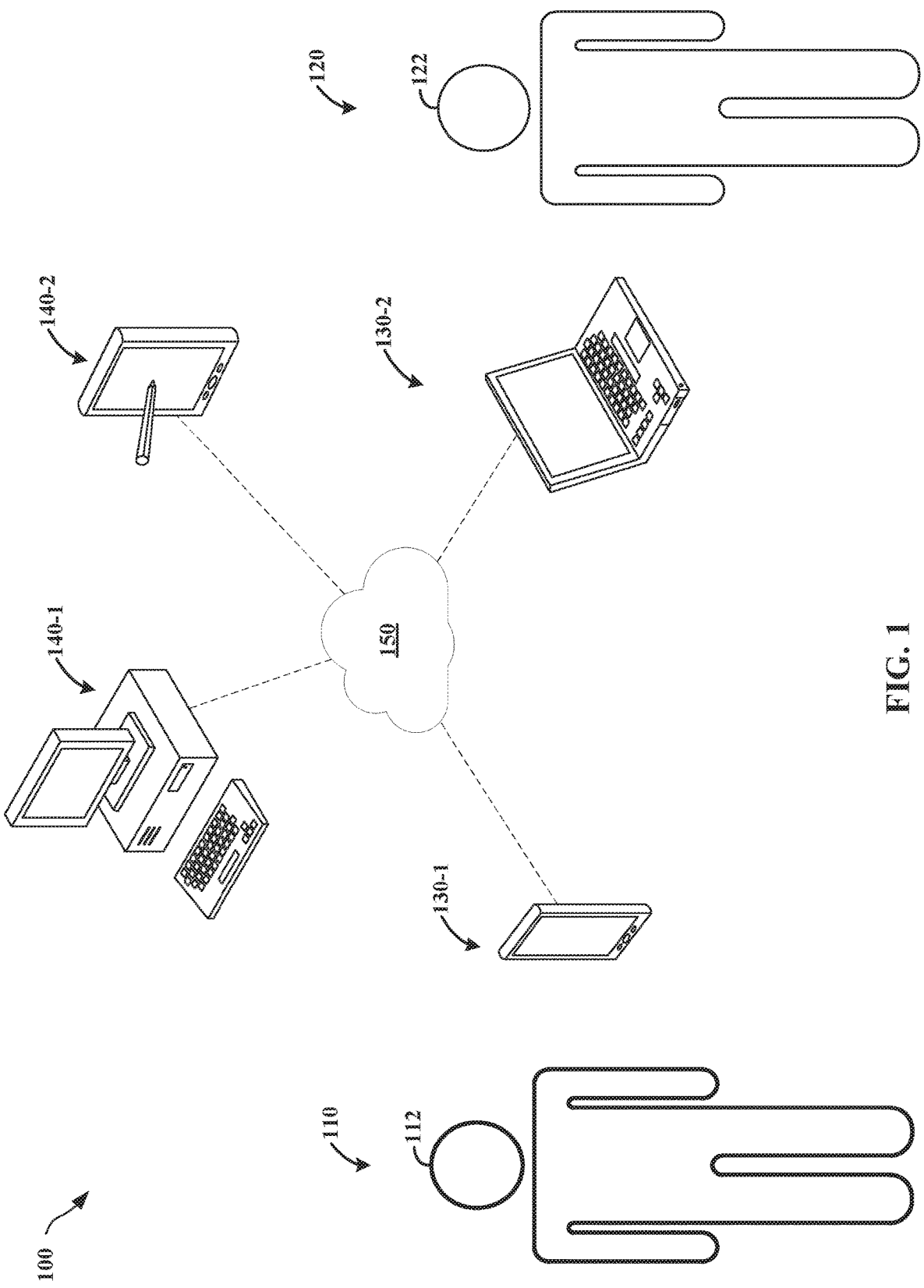
FIG. 1 depicts an example system for performing compression and decompression based on objects, consistent with some embodiments of the disclosure.

While embodiments of the invention are amenable to various modifications and alternative forms, specifics thereof have been shown by way of example in the drawings and will be described in detail. However, the invention is not limited to the particular embodiments described. On the contrary, the intention is to cover all modifications, equivalents, and alternatives falling within the spirit and scope of the invention.

DETAILED DESCRIPTION

Aspects of the present disclosure relate to video conferencing. More particular aspects relate to increasing performance of video conferencing. While the present disclosure is not necessarily limited to such applications, various aspects of the disclosure may be appreciated through a discussion of various examples using this context.

Remote conferencing, such as video conferencing, can be used in a variety of settings. For example, video conferencing may be used in commercial settings to connect people for work-related meetings. Video conferencing can be used in a medical setting to connect patients and medical professionals and to discuss treatment. Video conferencing may be used in residential settings between individuals to share audio and video.

Remote conferencing may be in the form of teleconferencing or video conferencing that includes the transmission and reception of audio, video, or a combination of audio and video. The technical demands for video conferencing may be high; users may desire a solution that preserves the quality of video. Consequently, the quality of source videos may also increase, such as with the adoption of high definition or ultra-high definition video.

One solution for providing high quality video during remote conferencing is that of improving network performance. Network performance can be improved by ensuring there is enough hardware (e.g., routers, switches) to permit an increased flow of data (e.g., bandwidth). Moreover, performance can be improved by providing increased uptime with more server and router overhead—to deal with inevitable downtimes caused by hardware failure. Improving network performance is costly, as the hardware and support required may be impractical. Moreover, network bandwidth is a shared resource with downsides related to usage patterns. During light traffic, good quality real-time video can be processed smoothly by transmitting every video frame when there is enough bandwidth. Conversely, bandwidth becomes insufficient during peak times, which drops the video resolution and facial quality down dramatically.

Another solution for providing high quality video is to use one or more compression/decompression interfaces ("CODECs") that improve the pixel compression ratio video streams. A CODEC may be an interface, algorithm, scheme, series of operations, or any relevant process for compressing and decompressing data. A CODEC that improves the pixel compression ratio may operate by utilizing a more complex set of rules and algorithms for analysis of a video stream. Each video stream can include a number of individual pictures that contain pixel data. A CODEC that improves the pixel compression ratio can then either maintain a similar quality while reducing file size or transmission throughput of a video or can increase quality while maintaining a similar file size or transmission throughput of a video.

Improved CODECs have thus far had drawbacks as well. First, improved CODECs may be more complex as analysis of the pictures in a video stream may include performing more complex computations, resulting in higher performance requirements. Second, CODECs, while improving pixel compression, are still resolution dependent. For example, as the resolution of a video stream increases, the pixel data—even in compressed form—may also increase.

Third, CODECs may be of such a complexity that efficient performance of compression and decompression may need to be implemented in hardware. For example, a computing device may be a cellular phone with a general purpose processor (e.g., a CPU) as well as dedicated hardware logic (e.g., an application-specific integrated circuit (ASIC)) configured to compress and decompress pixel data in a first CODEC format. If a new CODEC format that provides increased pixel compression ratios is selected, the cellular phone may not be able to compress or decompress the video stream without suffering from potentially harmful battery use or decreases in frame rate. Fourth, in some cases, the use of a new CODEC may lead to a full incompatibility. For example, a device's hardware, operating system, or both may be unable to process a video stream by way of a new CODEC. Fifth, during occasions of limited bandwidth, using a CODEC that improves the pixel compression ratio may have to reduce the quality of inter-picture compression pictures. The reduced quality of inter-picture compression may lead to artifacts, stuttering playback, or even intermittent loss of the entire picture.

Aspects of the disclosure may provide for improved compression through an object-based compression/decompression (OB CODEC). The OB CODEC may provide performance benefits as compared to existing video compression/decompression operations. The OB CODEC may take advantage of the peculiarities in conferencing systems such as video conferencing. For example, the OB CODEC can enhance the compression of subjects in the pictures of the video stream associated with the conference. The OB CODEC may operate by analyzing an image of a conference, such as a captured picture of a scene from a conference that includes a subject and a background. The subject may be a speaker such as a presenter or a listener. The OB CODEC may identify and extract features of the subject. The OB CODEC may transmit facial data instead of pixel data, such as features of the subject. The OB CODEC may extract received facial data from both a base picture (first image of a video stream) and real-time facial images (changing face of a subject due to expressions and speech during a video conference). Moreover, the OB CODEC may merge two pictures using algorithms (e.g., morphing, warping) to generate and display an altered picture on the screen of a receiver.

The features may save significant bandwidth compared to pixel data of the original video stream. In some embodiments, the OB CODEC may permit fallback to using pixel data, such as during times of excess bandwidth. If bandwidth becomes insufficient for sending pixel data, the OB CODEC may remove a large percentage of pixel data and insert bandwidth-efficient pixel data. In some embodiments, the OB CODEC may remove all pixel data from certain pictures of a video stream (e.g., compressed pictures, pictures with inter-frame compression, p-frames, b-frames).

FIG. 1 depicts an example system 100 for performing compression and decompression based on objects, consistent with some embodiments of the disclosure. System 100 may include the following: a plurality of clients 130, including a first client 130-1 and a second client 130-2, and a network 150 communicatively coupling the other components of the system. System 100 may also include one or more legacy clients, including a first legacy client 140-1 and a second legacy client 140-2 (which may be referred to collectively or representationally as 140). Each of the clients 130 and 140 of system 100 may be a computing device configured to process operations consistent with some embodiments.

Figure 7:
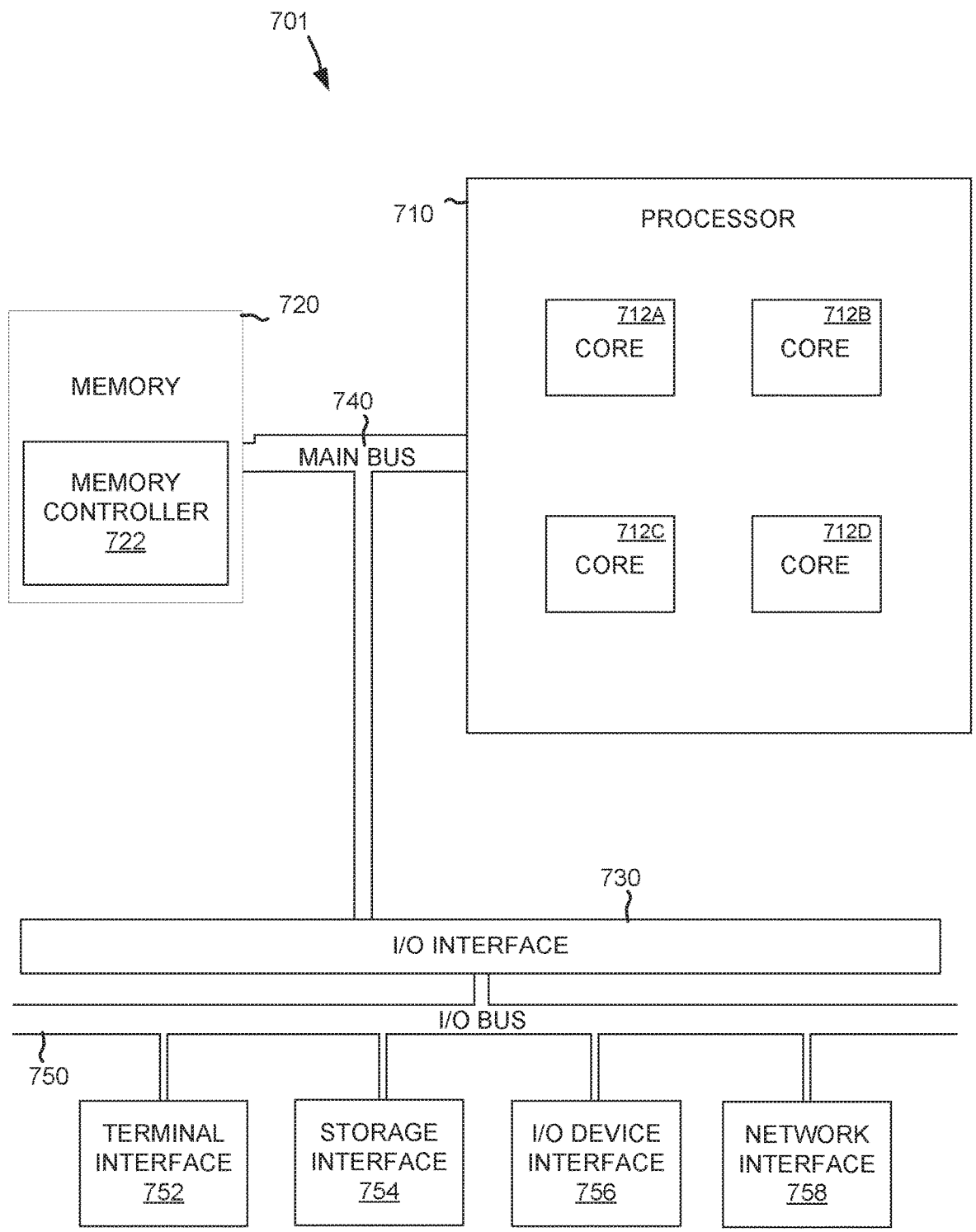
FIG. 7 depicts the representative major components of an example computer system that may be used, in accordance with some embodiments of the disclosure.

The clients 130 and 140 may each include a microphone (not depicted) and a camera (not depicted) to receive audio and visual data, e.g., for capturing sound and video of subjects in a video conference. The clients 130 and 140 may also include a speaker (not depicted) and a display for transmitting sound and video to a subject of a video conference, such as other subjects. The clients 130 and 140 may be a computer, smartphone, tablet, or other computing device including memory and processing. FIG. 7 depicts an example computer system 701 consistent with embodiments capable of operating as a client.

The first client 130-1 and the second client 130-1 may internally include processing and storage circuits, such as a processor and memory. The clients 130 may be configured to process video by compressing captured video, and decompressing received video from other clients. The video may include various pictures using various CODEC interfaces. For example, a first picture may include an intra-picture compression wherein only the first picture is used by the compression algorithm. In a second example, a second picture may include an inter-picture compression wherein other pictures may be used by the compression algorithm to compress the second picture. The legacy clients 140 may also be configured to process video streams based upon CODEC interfaces.

System 100 may operate by capturing a video stream of a first user 110 and a second user 120. System 100 may use OB CODEC to focus upon and identify certain objects of the first user 110 and the second user 120. For example, first user 110 may have a first face 112 and second user 120 may have a second face 122. The OB CODEC may identify from faces 112 and 122 facial data and may also operate by altering identified facial data. The clients 130 may be configured to manipulate a video stream using an OB CODEC consistent with some embodiments.

For example, during a conference, client 130-1 may capture a video stream of first user 110 in the form of pixel data (e.g., images, pictures, frames, fields). Facial data may be extracted from the captured pixel data from the video stream of first user 110. The captured facial data of a given picture may occupy less storage capacity than pixel data of the same picture. In situations of insufficient bandwidth (e.g., heavy usage, a partial network outage) some of the pixel data—and in some instances all pixel data—may be removed from the video stream. The video stream may be compressed, facial data may be embedded to the compressed stream, and the compressed stream may be sent to client 130-2 or one of the legacy clients 140.

System 100 may operate by decompressing compressed video streams based upon detected objects. For example, the clients 130 may receive compressed video streams that were compressed with an OB CODEC. Based on receiving an OB CODEC, a given client 130 may decompress the compressed video based on embedded facial data. The given client 130 may decompress the picture by reconstruction of the pixel data based solely upon the embedded facial data (e.g., the picture does not contain pixel data corresponding to the subject). The OB CODEC may intermittently transmit pictures containing pixel data as well as pictures containing only object data. The object data may be stored in a metadata corresponding to the picture. Clients 130 or any other client operating with the OB CODEC may be configured to read and retrieve the object data from the metadata.

System 100 may utilize an existing CODEC to implement an OB CODEC. For example, the compressed video may include data related to a CODEC such as a video compression having intra-picture compressed pictures and inter-picture compressed pictures. Legacy clients 140 may include specialized hardware, software, or some combination to perform compression and decompression operations consistent with the CODEC. A given legacy client 140 may receive a compressed video stream of pictures compressed with an OB CODEC. The given legacy client 140 may ignore the object data embedded into the video stream and may utilize only the reduced pixel data of the pictures. Consequently, legacy clients 140 may experience paused still pictures when decompressing and providing a conference stream compressed with an OB CODEC. Legacy clients 140 may be configured to perform operations of a CODEC without referencing non-pixel data, such as object data. In response, the operations of system 100 may be carried out by clients 130 without the knowledge of legacy clients 140.

Figure 2:
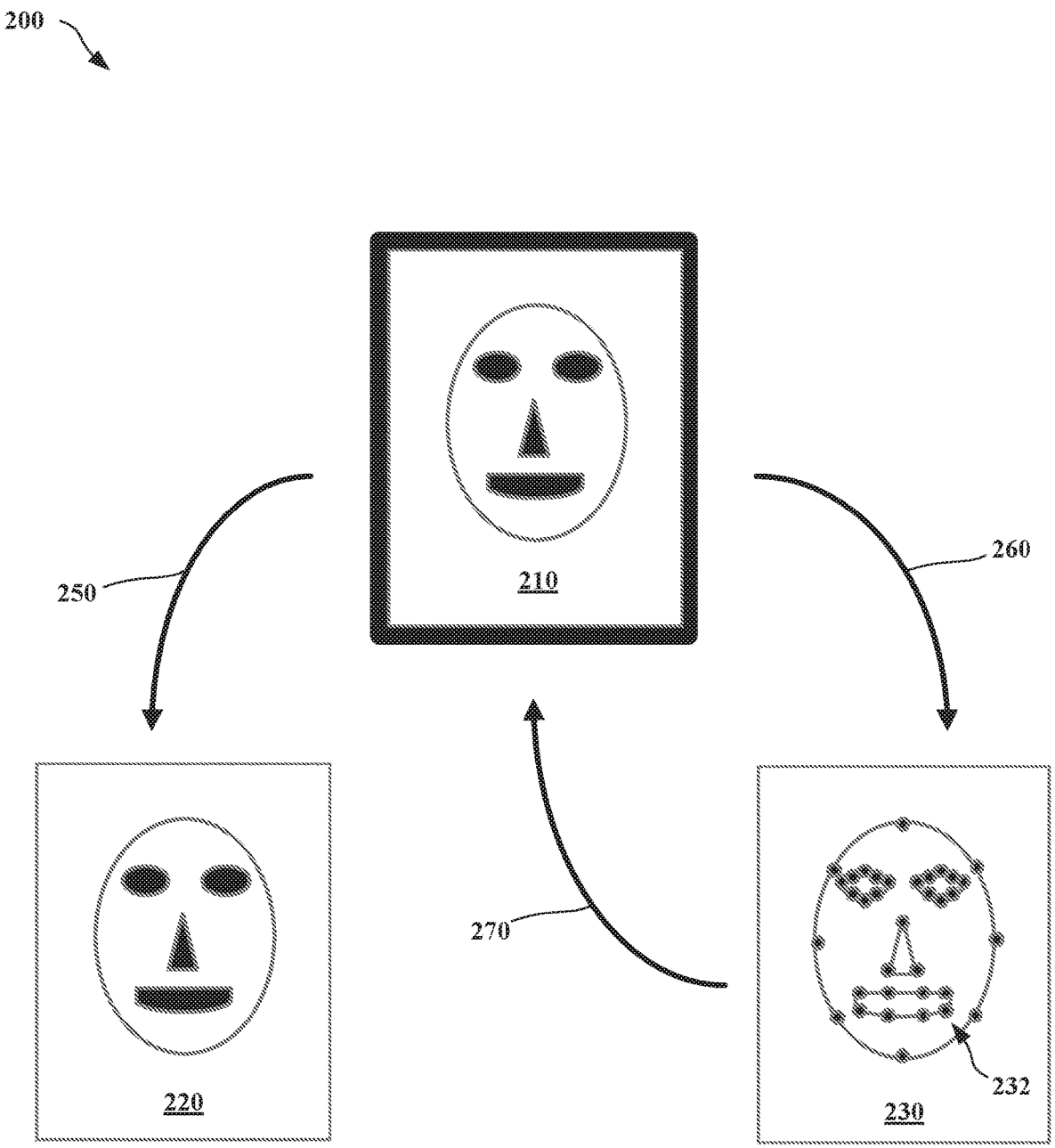
FIG. 2 depicts a flow representing an object-based compression algorithm, consistent with some embodiments of the disclosure.
Figure 3:
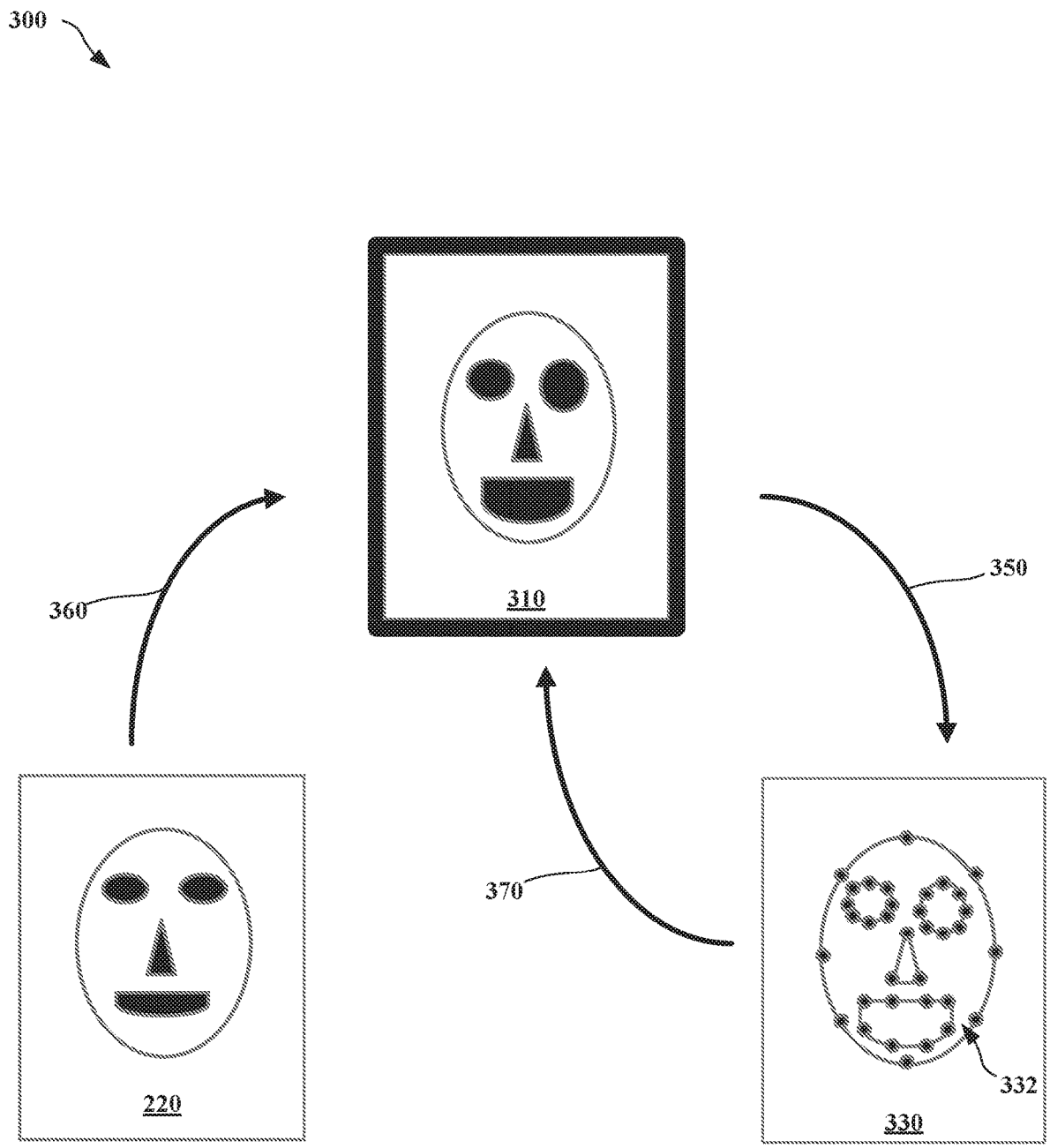
FIG. 3 depicts a flow representing an object-based compression algorithm, consistent with some embodiments of the disclosure.

FIG. 2 and FIG. 3 depict an example flow of images utilizing an object-based compression, consistent with some embodiments of the disclosure. The object-based compression may leverage a configured image processor (e.g., a part of the processor 710 in FIG. 7), configured to operate on a client device (e.g., a client 130 depicted in FIG. 1). The image processor may be a collection of hardware and software, such as an ASIC.

The image processor may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying a face (e.g., by analyzing images of faces using a model built on training data).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a teleconferencing scene that includes a person may be analyzed. Using a relevant object detection algorithm, the person may be identified.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., an ear, a nose, an eye, a mouth, etc.) can be output as classifications determined by the supervised machine learning model. For example, if a user snaps an image of their vehicle, a supervised machine learning algorithm may be configured to output an identity of the object (e.g., automobile) as well as various characteristics of their vehicle (e.g., the model, make, color, etc.).

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., two eyes), colors of object, and/or other attributes of objects. In some embodiments, the output may include an indication that an identity or characteristic of an object is unknown. The indication may include a request for additional input data that can be analyzed such that the identity and/or characteristics of objects may be ascertained. For example, a source of the object may be prompted to provide features of the face such that objects in their surrounding may be recognized. In some embodiments, various objects, object attributes, and relationships between objects (e.g., hierarchical and direct relations) may be represented within a knowledge graph (KG) structure. Objects may be matched to other objects based on shared characteristics (e.g., skin-tone of a cheek of a person and skin-tone of a chin of a person), relationships with other objects (e.g., an eye belongs to a face), or objects belonging to the same class (e.g., an identified eye matches a category of eyes).

FIG. 2 depicts a flow 200 representing an object-based compression algorithm, consistent with some embodiments of the disclosure. Flow 200 may be performed by a client device (e.g., client device 130-2 of FIG. 1). Flow 200 may operate on intra-picture compressed pictures. For example, a first pictured tagged by a processor or by a CODEC to compress a captured scene utilizing information only from the picture and not from other pictures. Flow 200 may include performing an OB CODEC upon a picture 210 of a series of pictures of a video stream.

Picture 210 may depict a scene of a teleconference, including a speaker. The speaker may be presenting information to a group through the video stream. Picture 210 may be received from a camera of a client device (e.g., a webcam of a computer). A pixel operation 250 may be performed on the picture 210. The pixel operation 250 may copy the picture 210 to create a picture copy 220. The operation 250 may include storing a picture copy 220 into a memory.

Object data 230 may be identified, at 260, within picture 210. The object data 230 may be a plurality of points. The plurality of points may correspond to features of the speaker. For example, a speaker's eyes and nose may correspond to features of the speaker. In another example, points 232 may correspond to object data 230 representative of a mouth of the speaker. In some embodiments, the points may correspond to the outline, edge, border or intersection of certain features.

The object data 230 and the picture 210, may be associated together at 270. Associating objected data 230 may be performed after the picture 210 is compressed with a compression algorithm. Associating of object data 230 may include inserting the object data into a non-pixel storage of the compressed video stream. For example, the video stream may be a file, and the non-pixel storage may be metadata of the file.

FIG. 3 depicts a flow 300 representing an object-based compression algorithm, consistent with some embodiments of the disclosure. Flow 300 may be performed by a client device (e.g., client device 130-2 of FIG. 1). Flow 300 may operate on inter-picture compressed pictures—for example, a first pictured tagged by a processor or by a CODEC to compress a captured scene utilizing information from the picture and from other pictures. Flow 300 may include performing an OB CODEC upon a picture 310 of a series of pictures of a video stream.

Picture 310 may depict a scene of a teleconference, including a speaker. The speaker may be presenting information to a group through the video stream. Picture 310 may be received from a camera of a client device (e.g., a webcam of a computer).

Object data 330 may be identified, at 350, within picture 310. The object data 330 may be a plurality of points. The plurality of points may correspond to features of the speaker. For example, a speaker's eyes and nose may correspond to features of the speaker. In another example, points 332 may correspond to object data 330 representative of a mouth of the speaker. In some embodiments, the points may correspond to the outline, edge, border or intersection of certain features.

A pixel operation 360 may be performed on the picture 310. The pixel operation 360 may replace picture 310 with pixel data 220 (see FIG. 2) from a previous picture. For example, pixel data 220 may be stored in a memory. The pixel data 220 may be from another picture of the scene of the speaker (e.g., at a time before picture 310 was captured, at a time after picture 310 was captured). Pixel data 220 may be selected because it is a picture compressed using intra-picture compression. The pixel operation 360 may be selected based on optimizing the compression of a CODEC.

For example, a first picture in a video stream depicts a scene at a first time and a second picture in a video stream depicts a scene at a second time just after the first time. A CODEC may be configured to determine the difference in pixel data from the first time to the second time. Portions of the scene that do not change may be represented by values that indicate no change. Leveraging this, a pixel operation of replacing all pixel data in a second scene with pixel data in a first scene may cause a compression algorithm to insert an extremely small amount of data, such as a pointer to the previous frame, or a binary flag representative of a duplicate frame. In some embodiments, replacing all pixel data may cause a compression algorithm to completely remove all pixel data leaving only a null value. The lack of data may save on bandwidth to transmit the video stream.

The object data 330 and the picture 310 may be associated together at 370. Associating object data 330 may be performed after the picture 310 is compressed with a compression algorithm. Associating of object data 330 may include inserting the object data 330 into a non-pixel storage of the compressed video stream. For example, the video stream may be a file, and the non-pixel storage may be metadata of the file.

Figure 4:
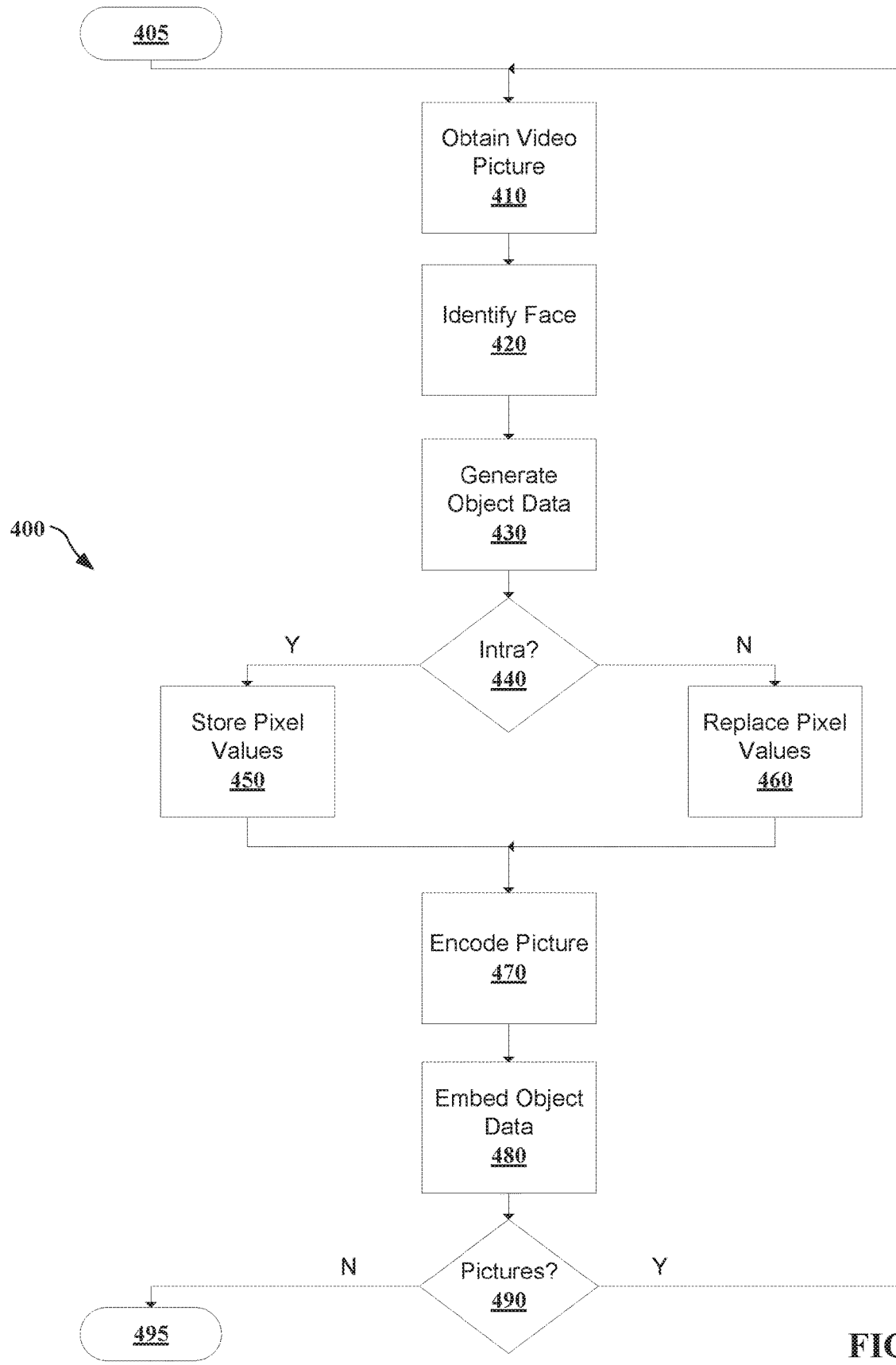
FIG. 4 depicts a method of compressing data, consistent with some embodiments of the disclosure.

FIG. 4 depicts a method 400 of compressing data consistent with some embodiments of the disclosure. Method 400 may be performed by a client device such as a smartphone or a computer system having a camera for capture of a video stream. FIG. 7 depicts a computer system capable of performing operations of a client device. Method 400 may be performed repeatedly based upon a time period (e.g., every second, every sixtieth of a second) or it may be event driven (e.g., for every picture of a video stream).

From start at 405, a picture from a video stream is obtained at 410. The picture may include pixel data captured from a camera. The captured pixel data may depict a scene including a background and a human narrator of a story. The video stream may include a plurality of pictures, each picture depicting the scene sequentially in a temporal fashion (e.g., a first picture of a first moment of the scene, a second picture of a second moment of the scene right after the first moment, etc.).

At 420 a face may be identified in the pixel data of an obtained picture of a video stream. The face may be identified by performing object detection upon the picture. The face may be identified by identifying a subject such a person having a head, a body, and arms. Performance of object detection may be based on one or more relevant techniques (e.g., edge detection, feature detection, object detection, image analysis). Identification of a face in an obtained picture may include identifying one or more features of the face (e.g., ears, eyes, hair, mouth).

At 430 object data may be generated from the pixel data of the picture. The object data may include the identified face. The generation may include an extraction operation (e.g., extracting information from pixel data). The generation operation may be performed based on one or more edge detection, feature identification, or neural networking-based image analysis. The object data may be in the format of a series of points. The points may be represented as co-ordinates such as an "x" value and a "y" value. In some embodiments, the points may further be represented with other attributes regarding the type of object detected, such as "nose" or the like.

At 440 it may be determined if the picture is to be compressed utilizing intra-picture compression. For example, the type of device that captured the video stream may be determined, as may be the compression format that is intended for the picture of the video stream or the compression format intended for the entire video stream. The determination, at 440, may be made based on upon one or more attributes of a CODEC or an encoder selected for compressing the video stream. The attributes may relate to one or more of the following: latency, editability, seeking or access speed, data integrity and resistance to data loss, CODEC algorithm processing and memory resources, a target size of the video stream (e.g., the bit-rate), and quality of compressed video. The attributes may relate to the pattern of inter-picture compression pictures (e.g., P-frames, B-frames) and intra-picture compassion pictures (e.g., I-frames). For example, a CODEC may set to use a standard for determining the number or ratio of inter-picture compression pictures to intra-picture compression pictures. The CODEC may mark certain pictures as key pictures that are to be compressed using only an intra-compression technique (e.g., a compression technique that can reconstruct a picture without using pixel data of any other picture).

If a picture is going to be compressed in an intra-picture compression format (440: Y), the pixel values (alternatively, pixel data) may be stored at 450. Storing of pixel values may be a pixel operation of manipulating the pixel data of the picture. Storing of pixel values may include storing information such as the height, width, brightness, and color values for every pixel of an obtained picture. The pixel values may be stored in a memory such as a DRAM or a long-term storage such as a magnetic disk. The stored picture may be referenced later (e.g., future iterations of method 400).

If a picture is not to be compressed in an intra-picture compression format (440: N), the pixel values in the picture may be replaced at 460. Replacing of pixel values may be a pixel operation of manipulating the pixel data of the picture. The pixel values may be replaced with values from another picture of the video stream. The other picture may be selected because the picture is a key picture, such as a picture to be compressed with an intra-compression format. The pixel values may be replaced from a store pictured, such as a picture stored in a memory.

At 470 the picture may be encoded into a compressed video. The compressed video may utilize a CODEC configured to compress certain pictures of a video stream using other pictures of the video stream (e.g., an inter-picture compression format). If the pixel values were replaced, at 460, then encoding of the picture into the compressed video at 470, may include recording no change. In some embodiments, encoding of the picture may include handing off the encoding operation to a compressor software or hardware outside of method 400.

At 480 the object data that was extracted at 430 may be embedded into the video stream. Embedding a data object may include relating object data that was generated or extracted to the picture. For example, a video stream may include a header and a series of compressed files. The header may indicate the CODEC selected and used by existing devices to decompress and retrieve the picture from the video stream. The series of compressed files may include pixel data in a compressed format, such as using a spatial compression that groups pixels having similar color or brightness values located in adjacent areas. The series of compressed files may include certain files having only pointers or references to previous files. Because method 400 may have replaced certain pictures with other pictures, the encoded stream may include certain compressed files having no pixel values (e.g., having only a pointer to another picture in the video stream, having a null value, having no values). The data objects that were detected and extracted may be placed into the compressed files.

If there are more pictures in the video stream (490: Y), the next picture in the video stream may be obtained at 410. If there are no more pictures in the video stream, (490: N), method 400 may end at 495.

Figure 5:
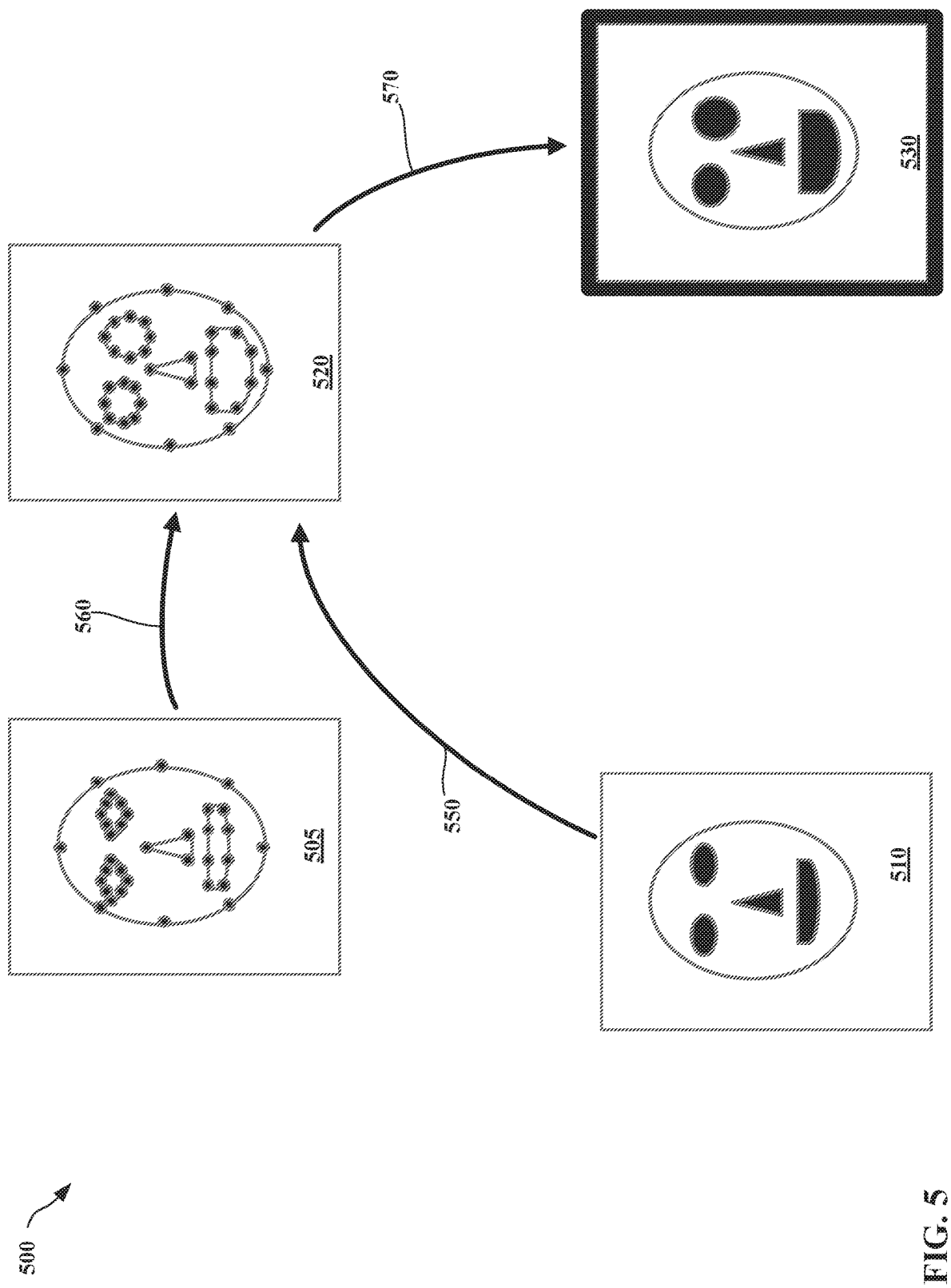
FIG. 5 depicts a flow representing an object-based decompression algorithm, consistent with some embodiments of the disclosure.

FIG. 5 depicts a flow 500 representing an object-based decompression algorithm consistent with some embodiments of the disclosure. Flow 500 may be performed by a client device (e.g., client device 130-1). Flow 500 may operate on inter-picture compressed pictures for example, a first pictured tagged by a processor or by a CODEC as compressed using information from the picture and from other pictures.

A processor may perform an OB CODEC decoder operation to perform one or more operations of flow 500. A picture 520 may be received from a video stream. The video stream may be a compressed video stream in a compressed format such as encoded with an OB CODEC. The picture 520 may contain no pixel data, such as no RGB values or no brightness values. The picture 520 may include a plurality of object data. The plurality of object data may represent a facial expression of a subject of a video (e.g., a person making a silly face to entertain another person). The object data may take up only a few bits of data. For example, data representing only a horizontal and a vertical position of a point. In a second example, data representing horizontal position, vertical position, and point number relative to other points.

At 550, pixel data of a second picture 510 may be retrieved. The second picture 510 may be a picture of a compressed video stream captured a moment before or after picture 520. The second picture 510 may be a key-frame, I-frame, or other picture compressed with intra-picture compression.

At 560, a second plurality of object data 505 may be retrieved. The second plurality of object data 505 may be directed at another picture of the compressed video stream. For example, the second plurality of object data 505 may correspond to second picture 510 of a compressed video stream.

Both the second picture 510 and the second plurality of object data 505 may be stored in a memory. For example, a buffer or cache of a random access memory of a client device during decoding of an OB CODEC.

At 570, picture 520 may be altered to generate a pixel-based image of picture 520. Picture 520 may be altered based on the second picture 510, such as by using the pixel data of picture 510 as a base image. Picture 520 may be altered based on the plurality of object data in picture 520 and the second plurality of object data 505 to produce the image 530. This may be achieved, for example, by warping or stretching the pixel data of picture 510 based on the change in points from the second plurality of object data 505 to the plurality of object data in picture 520.

Figure 6:
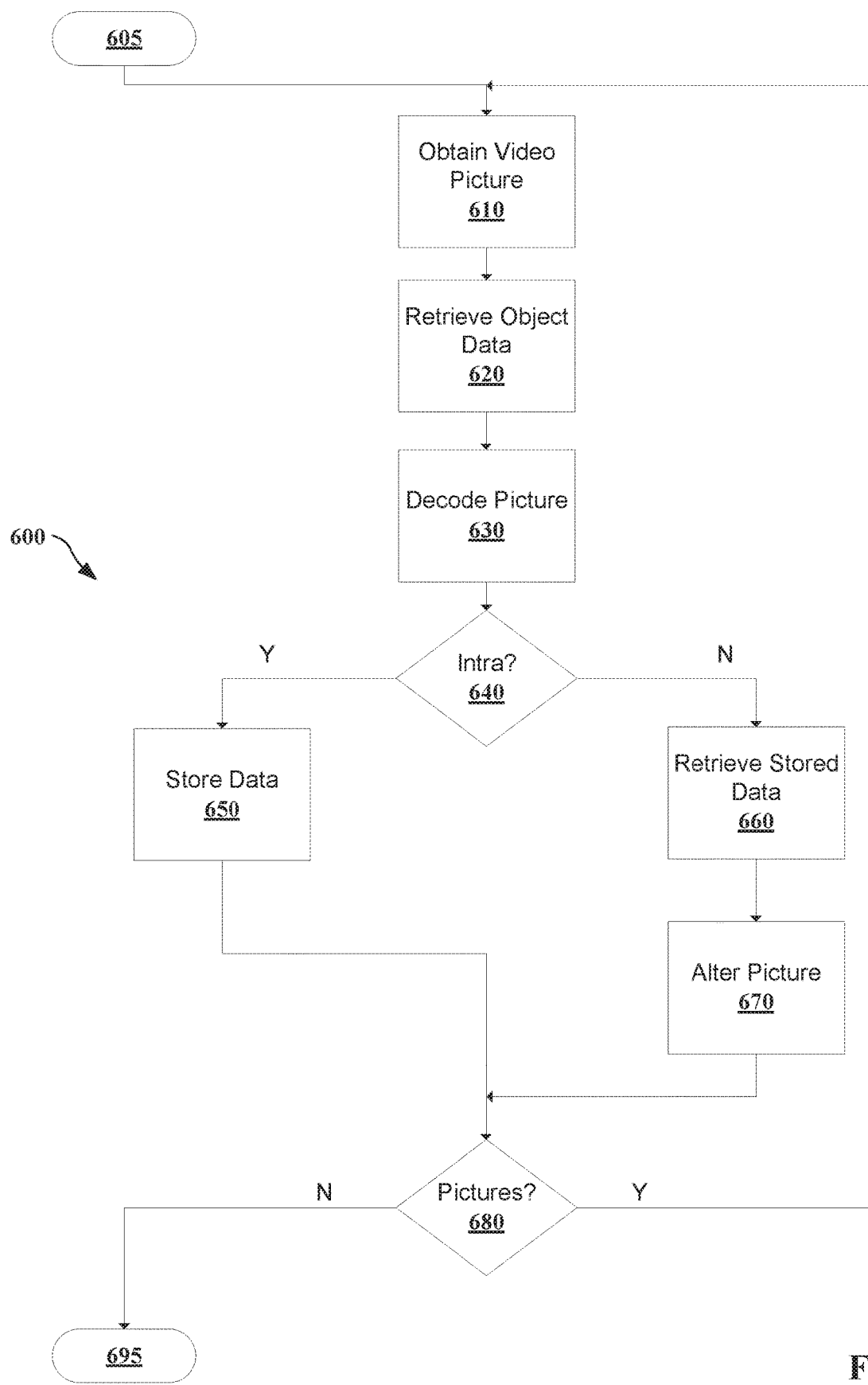
FIG. 6 depicts a method of decompressing data, consistent with some embodiments of the disclosure.

FIG. 6 depicts a method 600 of decompressing data consistent with some embodiments of the disclosure. Method 600 may be performed by a client device such as a smartphone or a computer system having a display for providing a video stream. FIG. 7 depicts a computer system 701 that may be utilized to of performing operations of a client device. Method 600 may be performed repeatedly based upon a period (e.g., every second, every sixtieth of a second). Method 600 may be performed repeatedly based upon a video stream (e.g., for every picture of a video stream).

From start 605, a picture may be obtained from a video stream at 610. A video stream of a conference, such as a telephone conference, may include a subject and a background. Obtaining a picture from the video stream may include retrieving a compressed video stream from a buffer or over a network. The compressed video stream may include a container or other specialized directory and a series of compressed files that correspond to pictures of the conference.

At 620, a plurality of object data is retrieved from the compressed video stream. The plurality of object data may be embedded into the video stream, such as being stored as metadata. The plurality of object data may be related to the video stream, such as a file contained in a video stream container file. The plurality of object data may be contained in a header of a stream of video data. The plurality of object data may relate to a depiction of a face and features of the face (e.g., points relating to the size, shape, and location of various facial features).

At 630, the picture obtained at 610 may be decoded. The picture may be decoded based on the video stream, such as based on any metadata describing the CODEC. An OB CODEC may be used to compress the video stream. The picture may have no pixel data, or the picture may have a pointer to a second picture having pixel data. Based on decoding, the second picture may be placed in the decoded picture.

At 640, it may be determined if the picture is an intra-picture compressed picture. The determination at 640 may be based on metadata of the picture. The determination at 640 may be based on a CODEC specified in the file. For example, an H264 CODEC may be selected for transmission and leveraged to make an OB CODEC. The H264 CODEC may specify that every third picture, or every fifth picture should be compressed based on an intra-compression scheme. The determination, at 640, may leverage this knowledge of the type of CODEC used as a basis of the OB CODEC.

If the picture is an intra-picture compressed picture (640: Y), data may be stored in a memory at 650. The pixel data may be stored or saved into a long-term storage or a secondary storage to reference later. The object data may be stored or saved into a long-term storage or secondary storage to reference later.

If the picture is not an intra-picture compressed picture (640: N), stored data may be retrieved at 660. The stored data may include object data and may include pixel data of another picture. As part of retrieving the stored data at 660 any existing data contained in the decoded picture may be discarded, such as removing or deleting any null values or pointers to other pictures.

At 670, the picture may be altered. The picture may be altered based on the retrieved object data as well as the retrieved pixel data. The alteration may be a relevant technique, such as performing one or more of the following: warping, shifting, smearing, stretching, morphing, or otherwise manipulating the picture.

If there are more pictures to be processed from the compressed video stream (680: Y), method 600 proceeds again to obtain the next picture at 610. If there are not more pictures (680: N), method 600 ends at 695.

FIG. 7 depicts the representative major components of an example computer system 701 that may be used, in accordance with some embodiments of the disclosure. It is appreciated that individual components may vary in complexity, number, type, and\or configuration. The particular examples disclosed are for example purposes only and are not necessarily the only such variations. The computer system 701 may comprise a processor 710, memory 720, an input/output interface (herein I/O or I/O interface) 730, and a main bus 740. The main bus 740 may provide communication pathways for the other components of the computer system 701. In some embodiments, the main bus 740 may connect to other components such as a specialized digital signal processor (not depicted).

The processor 710 of the computer system 701 may be comprised of one or more cores 712A, 712B, 712C, 712D (collectively 712). The processor 710 may additionally include one or more memory buffers or caches (not depicted) that provide temporary storage of instructions and data for the cores 712. The cores 712 may perform instructions on input provided from the caches or from the memory 720 and output the result to caches or the memory. The cores 712 may be comprised of one or more circuits configured to perform one or more methods consistent with embodiments of the present disclosure. In some embodiments, the computer system 701 may contain multiple processors 710. In some embodiments, the computer system 701 may be a single processor 710 with a singular core 712.

The memory 720 of the computer system 701 may include a memory controller 722. In some embodiments, the memory 720 may comprise a random-access semiconductor memory, storage device, or storage medium (either volatile or non-volatile) for storing data and programs. In some embodiments, the memory may be in the form of modules (e.g., dual in-line memory modules). The memory controller 722 may communicate with the processor 710, facilitating storage and retrieval of information in the memory 720. The memory controller 722 may communicate with the I/O interface 730, facilitating storage and retrieval of input or output in the memory 720.

The I/O interface 730 may comprise an I/O bus 750, a terminal interface 752, a storage interface 754, an I/O device interface 756, and a network interface 758. The I/O interface 730 may connect the main bus 740 to the I/O bus 750. The I/O interface 730 may direct instructions and data from the processor 710 and memory 720 to the various interfaces of the I/O bus 750. The I/O interface 730 may also direct instructions and data from the various interfaces of the I/O bus 750 to the processor 710 and memory 720. The various interfaces may include the terminal interface 752, the storage interface 754, the I/O device interface 756, and the network interface 758. In some embodiments, the various interfaces may include a subset of the aforementioned interfaces (e.g., an embedded computer system in an industrial application may not include the terminal interface 752 and the storage interface 754).

Logic modules throughout the computer system 701—including but not limited to the memory 720, the processor 710, and the I/O interface 730—may communicate failures and changes to one or more components to a hypervisor or operating system (not depicted). The hypervisor or the operating system may allocate the various resources available in the computer system 701 and track the location of data in memory 720 and of processes assigned to various cores 712. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    obtaining, by a first computing device, a source picture to be compressed in a video stream, wherein the source picture includes pixel data that depicts a scene;
    identifying, by the first computing device and based on the pixel data, a subject in the pixel data that depicts the scene;
    generating, by the first computing device and based on the identifying of the subject, a plurality of object data, wherein the plurality of object data is related to the subject, and wherein the plurality of object data includes co-ordinate information that describes a horizontal position and a vertical position of a first subset of the pixel data of the subject in the source picture;
    determining, by the first computing device, a compression format of the source picture to be compressed in the video stream;
    performing, by the first computing device and before compression of the source picture and based on the determining of the compression format, a pixel operation on the source picture for generating a compressed picture;
    relating, by the first computing device and after compression of the source picture, the generated plurality of object data with the compressed picture, the compressed picture compressed with the compression format, wherein the compression format of is configured to remove a first subset of the pixel data of the compressed picture and include the plurality of object data related to the first subset of the pixel data of the subject, in response to changes in bandwidth availability; and updating, based on the related compressed picture with the plurality of object data, the video stream.

2. The method of claim 1, wherein:
the compression format is an intra-picture compression format; and
the performing of the pixel operation on the picture comprises:
creating the compressed picture using the intra-picture compression format; and
storing the compressed picture in a memory.

3. The method of claim 1, wherein the method further comprises:
receiving, by a second computing device, a compressed video stream including the compressed picture, wherein the compression format of the compressed picture is an intra-picture compression format;
retrieving, by the second computing device, the generated plurality of object data;
storing, by the second computing device, the generated plurality of object data in a second memory;
determining, by the second computing device, the compression format of the compressed picture in the compressed video stream;
decompressing, by the second computing device and based on the determining of the compression format, the compressed picture to produce a decompressed picture; and
storing the decompressed picture in the second memory.

4. The method of claim 1, wherein:
the compression format of the source picture to be compressed is an inter-picture compression format; and
the performing the pixel operation on the picture comprises:
replacing the pixel data of the source picture with a second pixel data, wherein the second pixel data is of a previous picture, where the previous picture is compressed in an intra-picture compression format, wherein the previous picture was captured before the source picture.

5. The method of claim 4, wherein the further method comprises:
receiving, by a second computing device, a compressed video stream including the compressed picture, wherein a compression format of the compressed picture is an inter-picture compression format;
retrieving, by the second computing device, the plurality of object data from the compressed video stream;
determining, by the second computing device, the compression format of the compressed picture in the compressed video stream;
retrieving, by the second computing device, a previously received picture, wherein the previously received picture was captured before the source picture;
retrieving, by the second computing device, a second plurality of object data, wherein the second plurality of object data relates to the previously received picture; and
altering, by the second computing device, based on the second plurality of object data and based on the plurality of object data, the previously received picture to create an altered picture.

6. The method of claim 5, wherein the method further comprises:
discarding the compressed picture of the compressed video stream; and
inserting the altered picture into a decompressed video stream, the decompressed video stream corresponding to the compressed video stream.

7. The method of claim 5, wherein the altering is selected from the group consisting of warping, morphing, and smearing.

8. A system, the system comprising:
a memory, the memory containing one or more instructions; and
a processor, the processor communicatively coupled to the memory, the processor, in response to reading the one or more instructions, configured to: with the picture,
obtain, by a first computing device, a source picture to be compressed in a video stream, wherein the source picture includes pixel data that depicts a scene;
identify, by the first computing device and based on the pixel data, a subject in the pixel data that depicts the scene;
generate, by the first computing device and based on the identifying of the subject, a plurality of object data, wherein the plurality of object data is related to the subject, and wherein the plurality of object data includes co-ordinate information that describes a horizontal position and a vertical position of a first subset of the pixel data of the subject in the source picture;
determine, by the first computing device, a compression format of the source picture to be compressed in the video stream;
perform, by the first computing device and before compression of the source picture and based on the determining of the compression format, a pixel operation on the source picture for generating a compressed picture;
relate, by the first computing device and after compression of the source picture, the generated plurality of object data with the compressed picture, the compressed picture compressed with the compression format, wherein the compression format is configured to remove a first subset of the pixel data of the compressed picture and include the plurality of object data related to the first subset of the pixel data of the subject, in response to changes in bandwidth availability; and
update, based on the related compressed picture with the plurality of object data, the video stream.

9. The system of claim 8, wherein:
the compression format is an intra-picture compression format; and
the performing of the pixel operation on the picture comprises:
creating the compressed picture using the intra-picture compression format; and
storing the compressed picture in a memory.

10. The system of claim 8, wherein the system comprises:
a second memory; and
a second processor, the second processor communicatively coupled to the second memory, the second processor configured to:
receive a compressed video stream including the compressed picture, wherein the compression format of the compressed picture is an intra-picture compression format;
retrieve the generated plurality of object data;

store the generated plurality of object data in the second memory;
determine, the compression format of the compressed picture in the compressed video stream;
decompress, based on the determining the compression format, the compressed picture to produce a decompressed picture; and
store the decompressed picture in the second memory.

11. The system of claim 8, wherein:
the compression format of the source picture to be compressed is an inter-picture compression format; and
the performing the pixel operation on the picture comprises:
replacing the pixel data of the source picture with a second pixel data, wherein the second pixel data is of a previous picture, where the previous picture is compressed in an intra-picture compression format, wherein the previous picture was captured before the source picture.

12. The system of claim 11, wherein the system comprises:
a second memory; and
a second processor, the second processor communicatively coupled to the memory, the second processor configured to:
receive a compressed video stream including the compressed picture, wherein a compression format of the compressed picture is an inter-picture compression format;
retrieve the plurality of object data from the compressed video stream;
determine the compression format of the compressed picture in the compressed video stream;
retrieve a previously received picture, wherein the previously received picture occurred in the scene before the picture;
retrieve a second plurality of object data, wherein the second plurality of object data relates to the previously received picture; and
alter, based on the second plurality of object data and based on the plurality of object data, the previously received picture to create an altered picture.

13. The system of claim 11, wherein the second processor is further configured to:
discard the compressed picture of the compressed video stream; and
insert, the altered picture into a decompressed video stream, the decompressed video stream corresponding to the compressed video stream.

14. The system of claim 11, wherein the alter the previously received picture is selected from the group consisting of warping, morphing, and smearing.

15. A computer program product, the computer program product comprising a computer readable storage medium having program instructions embodied therewith, the program instructions configured to:
obtain, by a first computing device, a source picture to be compressed in a video stream, wherein the source picture includes pixel data that depicts a scene;
identify, by the first computing device and based on the pixel data, a subject in the pixel data that depicts the scene;
generate, by the first computing device and based on the identifying of the subject, a plurality of object data, wherein the plurality of object data is related to the subject, and wherein the plurality of object data includes co-ordinate information that describes a horizontal position and a vertical position of a first subset of the pixel data of the subject in the source picture;
determine, by the first computing device, a compression format of the source picture to be compressed in the video stream;
perform, by the first computing device and before compression of the source picture and based on the determining of the compression format, a pixel operation on the source picture; and
relate, by the first computing device and after compression of the source picture, the generated plurality of object data with the compressed picture, the compressed picture compressed with the compression format, the compression format capable of removing a first subset of the pixel data and including the plurality of object data related to the first subset of the pixel data in response to changes in bandwidth availability.

16. The computer program product of claim 15, wherein:
the compression format is an intra-picture compression format; and
the performing of the pixel operation on the picture comprises:
creating the compressed picture using the intra-picture compression format; and
storing the compressed picture in a memory.

17. The computer program product of claim 15, wherein the program instructions configured to:
receive, by a second computing device, a compressed video stream including the compressed picture, wherein the compression format of the compressed picture is an intra-picture compression format;
retrieve, by the second computing device, the generated plurality of object data;
store, by the second computing device, the generated plurality of object data in a second memory;
determine, by the second computing device, the compression format of the compressed picture in the compressed video stream;
decompress, by the second computing device and based on the determining the compression format, the compressed picture to produce a decompressed picture; and
store the decompressed picture in the second memory.

18. The computer program product of claim 15, wherein:
the compression format of the source picture to be compressed is an inter-picture compression format; and
the performing the pixel operation on the picture comprises:
replacing the pixel data of the picture with a second pixel data, wherein the second pixel data is of a previous picture, where the previous picture is compressed in an intra-picture compression format, wherein the previous picture occurred in the scene before the picture.

19. The computer program product of claim 18, wherein the program instructions configured to:
receive, by a second computing device, a compressed video stream including the compressed picture, wherein the compression format of the compressed picture is an inter-picture compression format;
retrieve, by the second computing device, the plurality of object data from the compressed video stream;
determine, by the second computing device, the compression format of the compressed picture in the compressed video stream;
retrieve, by the second computing device, a previously received picture, wherein the previously received picture occurred in the scene before the picture;

retrieve, by the second computing device, a second plurality of object data, wherein the second plurality of object data relates to the previously received picture; and alter, by the second computing device and based on the second plurality of object data and based on the plurality of object data, the previously received picture to create an altered picture.

20. The computer program product of claim 19, wherein the program instructions configured to:

discard the compressed picture of the compressed video stream; and insert, the altered picture into a decompressed video stream, the decompressed video stream corresponding to the compressed video stream.

* * * * *